May 11, 1965
AKIRA TANAKA
SEAT ADJUSTER
3,182,947
Filed Jan. 29, 1963
2 Sheets-Sheet 2
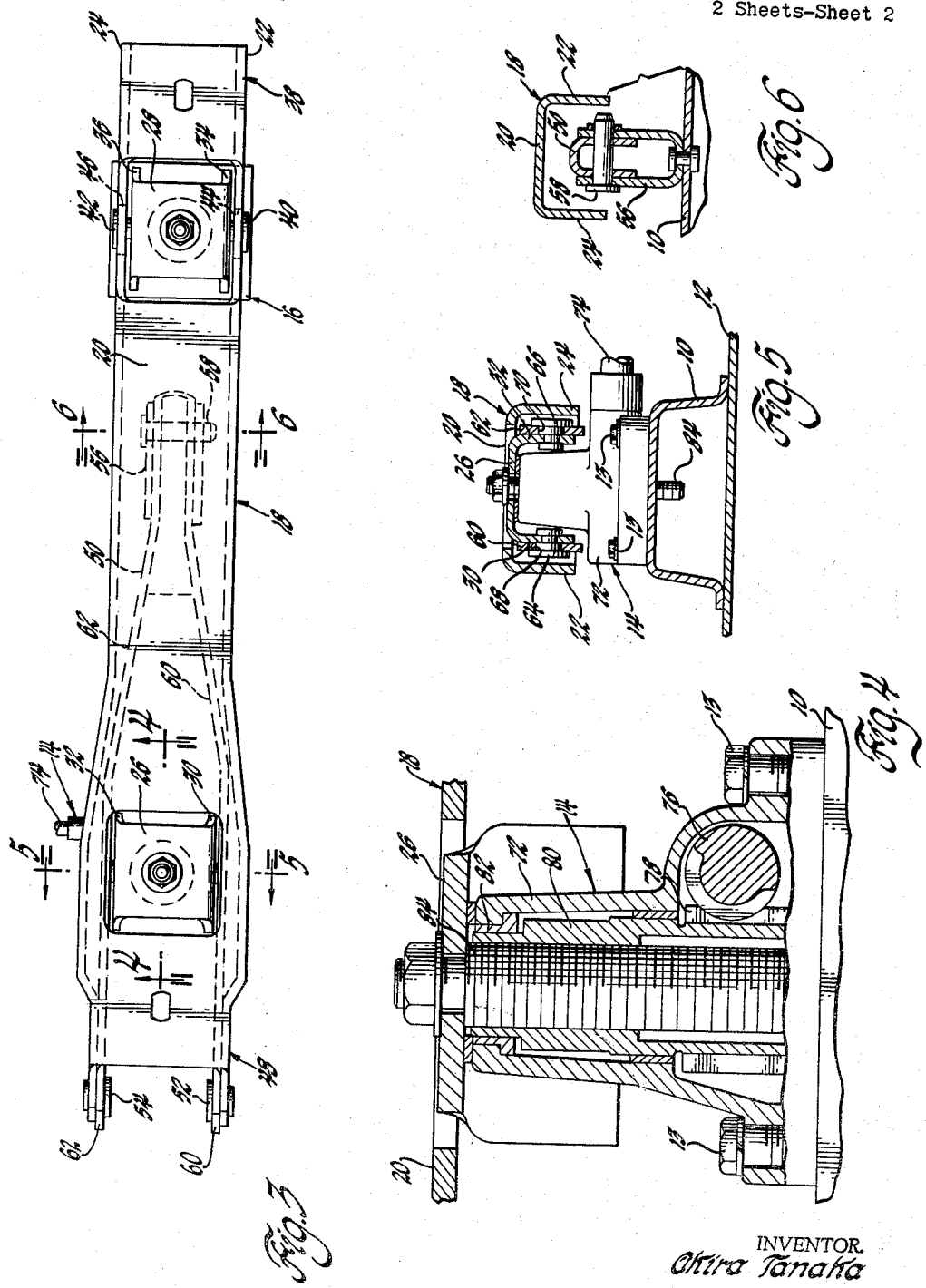
INVENTOR.
Akira Tanaka
BY
S.C. Thorpe
ATTORNEY United States Patent Office 3,182,947
Patented May 11, 1965

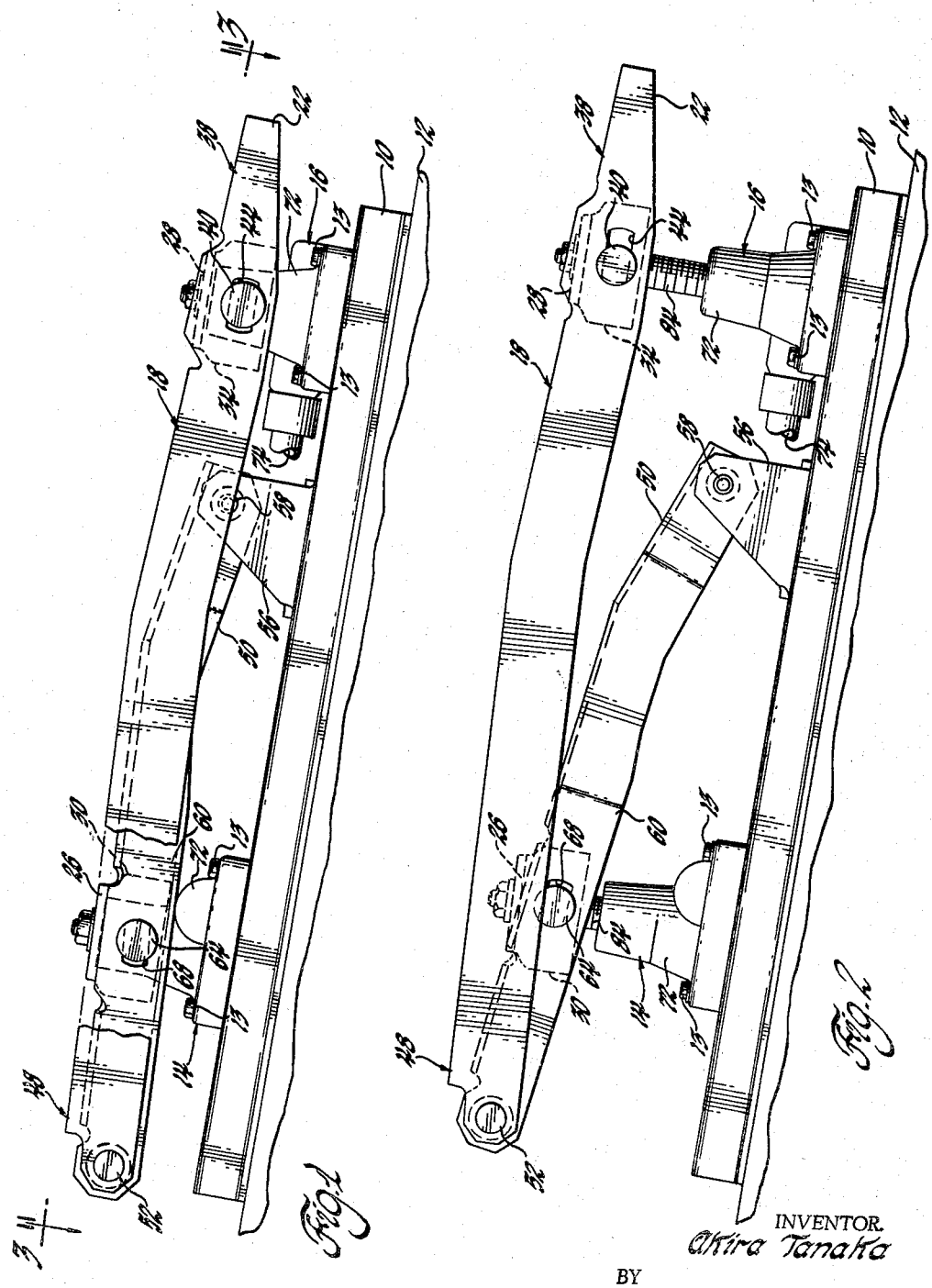

3,182,947
SEAT ADJUSTER
Akira Tanaka, Southfield, Mich., assignor to General Motors Corporation, Detroit, Mich., a corporation of Delaware
Filed Jan. 29, 1963, Ser. No. 254,774
5 Claims. (Cl. 248—421)

This invention relates to seat adjusters of the type commonly used in motor vehicles and more particularly to those providing height adjustments through the use of vertically extensible links.

Such vertical seat adjusters conventionally employ swingable links interconnecting the vehicle floor and seat at the front and rear of the seat, and a power actuated rack and pinion or extensible link to effect the necessary movement of the swingable links for adjusting the seat height. These units have a multiplicity of parts and are difficult to assemble. To simplify the structure and reduce manufacturing costs, the present invention employs vertically extensible links to interconnect the seat and floor members, and provides for pivotal movement with the floor or seat member at only one end of each of these extensible links. With one end of each extensible link thus rigidly fixed to one member, the other end must, of necessity, have provision for generally horizontal lost motion and pivoting relative to the other member in order to accommodate independent tilting of the front and rear of the seat. A rigid link, pivotally connected at its respective ends to the seat and floor, serves to provide stability in the adjuster mechanism by preventing any horizontal lost motion when the seat is adjusted to the desired position.

Also in accordance with the invention, one of the extensible link connections is preferably made to the rigid link, at a point intermediate its ends, so that movement of that extensible link will be multiplied through the rigid link and thereby effect greater movement of the seat for a given adjustment of the extensible link.

These and other objects of this invention will become more apparent as reference is had to the accompanying specification and drawings wherein:

FIGURE 1 is a side view of the present invention with the seat adjuster at its lowermost position.

FIGURE 2 is a side view of the seat adjuster in its fully extended, uppermost position.

FIGURE 3 is a plan view of the seat adjuster unit generally along the line 3—3 of FIGURE 1.

FIGURE 4 is a sectional view substantially along line 4—4 of FIGURE 3 showing the extensible link mechanism in its fully down position, with sections cut away.

FIGURE 5 is a view substantially along the lines 5—5 of FIGURE 3 illustrating the position of the horizontal link and extensible link in the fully down position.

FIGURE 6 is a view in the direction of the arrows substantially along line 6—6 of FIGURE 3 showing the pivotal connection of the horizontal link to the lower support member.

Referring now to the drawings, a vertical seat adjusting mechanism is shown comprising a lower supporting member 10 which may be secured by welding or other suitable means to a vehicle floor or other supporting platform 12. Two extensible links, shown in the form of front and rear screw jacks indicated generally by numerals 14 and 16, are rigidly secured by bolts 13 to the lower support member 10. An upper support member 18, having a channel shaped cross section (FIGURES 5 and 6) is adapted to support a seating unit (not shown).

The upper support member 18 has a web section 20 with depending arms 22, 24. Screw jacks 14 and 16 have connecting plates 26, 28, respectively, secured to their upper ends. The plates 26, 28 have depending arms 30, 32 and 34, 36, respectively, for connecting the screw jacks. One end 38 of the upper support member 18 is pivotally and slidably connected to the rear extensible link 16 by pivot pins 40, 42 which are slidable in slots 44, 46 formed in the depending arms 22, 24 of upper support member 18 and are pivotally secured to arms 34, 36 of connecting plate 28. The other end 48 of upper support member 18 is pivotally connected to one end of a generally horizontal rigid link 50 by pivot pins 52, 54. The rigid link 50 is yoke shaped having arms 60, 62 which are spaced apart at one end and pivotally connected to the depending arms 22, 24 of the upper support member 18 by the pivot pins 52, 54, respectively. The other end of rigid link 50 is pivotally connected to a bracket 56 by pivot pin 58. Bracket 56 is secured to the lower support member 10 by rivets or other suitable means, as seen in FIGURE 3.

As best seen in FIGURES 2 and 5, the front extensible link 14 is pivotally and slidably connected to the rigid link 50, intermediate the ends thereof, by pivot pins 64, 66. The pivot pins 64, 66 are slidable in generally horizontal slots 68, 70 formed in the arms 60, 62 of the rigid link 50, and are pivotally secured to the depending arms 30, 32 of connecting plate 26.

The extensible links or screw jacks 14, 16 are similarly constructed, thus, for brevity only the construction of the front screw jack, shown in FIGURE 5, will be described. The same reference numerals will be used where applicable on the rear screw jack 16. The screw jack 14, enclosed in housing 72, is connected to a reversible electric motor (not shown) by a flexible drive cable 74. Such cable drives a worm 76 (FIGURE 4) in meshing engagement with a gear 78 formed on the lower outer portion of a sleeve member 80 which is journalled in bearing 82 at the upper end and on needle bearing (not shown) at the lower end for rotation in the housing 72. The upper internal surface of sleeve member 80 is in threaded engagement with a screw shaft 84 whose upper end is rotatably secured to connecting plate 26. Thus, as the sleeve member 80 is rotated, the shaft 84 moves axially of the sleeve member, imparting vertical adjustment of the front of the seating unit supported thereon.

In operation, a conventional, reversible motor with conventional transmission may be used to actuate the screw jacks or extensible links 14 and 16. The screw jacks may be operated independently to tilt the seat or in unison to raise or lower it uniformly. When one end of the upper support member 18 is raised or lowered while the other end remains stationary, the slots 44, 46 and 68, 70 allow fore and aft lost motion sliding adjustment of the upper support member to prevent binding of the adjuster due to the changing distances between the respective connections. The rigid link 50, which is pivotally connected to the lower support member 10 through bracket 56 and pin 58 and to the upper support member 18 by pins 52 and 54, secures the upper support member from fore and aft movement when the seat is adjusted.

By connecting the screw jack 14 between the pivotally connected ends of the rigid link 50, instead of directly to the upper support member 18, a vertical movement multiplying effect by rigid link 50 is imparted to the upper support member. As screw jack 14 causes link 50 to rotate about pivot pin 36, the end 48 of upper support member 18 will be moved a greater vertical distance than the screw jack 14 moves, thus providing the multiplying effect of the link 50 to the movement of the screw jack.

While the preferred embodiment of the present invention has been shown and described herein, it is obvious that many structural details may be changed without

I claim:

1. A seat adjuster having an upper support member, a lower support member, a pair of spaced extensible links actuatable to move one of said members generally vertically relative to the other member, one of said extensible links having one end rigidly secured to one of said members and having a connection at its other end to the other member, said connection accommodating generally horizontal lost motion in the plane defined by said pair of extensible links and pivotal movement between said one extensible link and said other member, a rigid link pivotally interconnecting said members and extending in a generally horizontal direction generally parallel to said plane, said other extensible link having connections at its respective ends to said rigid link and one of said members, one of said last named connections accommodating both pivotal and sliding movement of said other extensible link and rigid link in said plane, and the other of said last named connections fixing said rigid link and said last named member against movement in said plane.

2. A seat adjuster mechanism having an upper support member adapted to support a load, a lower support member adapted to be secured to a platform, a horizontally inclined rigid link having one end pivotally secured to said upper support member and the other end pivotally secured to said lower support member, a pair of vertically extensible links, one of said extensible links having one end rigidly secured to one of said members, a connection securing the other end of said one extensible link to the other of said members for sliding and pivoting movement in the plane of said pair of extensible links, the other of said extensible links having one end fixed to one of said members, and a slidable pivot connection securing the other end of said other extensible link to said rigid link for sliding and pivoting movement in said plane, and means to actuate said extensible links.

3. Seat adjuster apparatus adapted to support a vehicle seat for vertical adjustment relative to a vehicle floor, comprising an upper support member adapted to have a vehicle seat secured thereto, a lower support member adapted to be secured to a vehicle floor, a horizontally inclined rigid link having one end pivotally connected to said upper support member and the other end pivotally connected to said lower support member, front and rear generally vertically actuatable extensible links to move said upper member vertically relative to said lower member, each extensible link having one of its ends fixed to said lower support member, the other end of said front extensible link having a slidable pivot connection to said rigid link intermediate the pivotally connected ends thereof, the other end of said rear extensible link having a slidable pivot connection to said upper support member, said pivot connections accommodating pivoting and sliding fore and aft movement of said rigid link and upper support member relative to said extensible links and in the plane of said extensible links, and means to actuate each said extensible link independently of the other.

4. The invention of claim 3 wherein said other end of said rigid link is pivotally connected to said lower support member intermediate said extensible links, said rigid link comprising two arms embracing said front extensible link.

5. A seat adjuster mechanism having an upper support member adapted to support a load, a lower support member adapted to be secured to a platform, a horizontally inclined rigid link having one end pivotally secured to said upper support member and the other end pivotally secured to said lower support member, a pair of vertically extensible links, one of said extensible links having one end fixed to one of said members, a connection securing the other end of said one extensible link to the other of said members for sliding and pivoting movement in the plane of said pair of extensible links, the other of said extensible links having one end fixed to one of said members, and a connection securing the other end of said other extensible link to said rigid link for sliding and pivoting movement in said plane, and means to actuate said extensible links, said last named connection is located intermediate the pivotally secured ends of said rigid link.

References Cited by the Examiner

UNITED STATES PATENTS 3,006,594  10/61  Gruendler _____ 248—396 X

CLAUDE A. LE ROY, *Primary Examiner.*

FRANK L. ABBOTT, *Examiner.*